T. E. MURRAY, Jr., AND J. B. MURRAY.
WELDING ELECTRODE.
APPLICATION FILED MAR. 22, 1918.

1,303,575.

Patented May 13, 1919.

INVENTORS
Thomas E. Murray Jr.
Joseph B. Murray
BY
his ATTORNEY

UNITED STATES PATENT OFFICE.

THOMAS E. MURRAY, JR., AND JOSEPH B. MURRAY, OF BROOKLYN, NEW YORK.

WELDING-ELECTRODE.

1,303,575.

Specification of Letters Patent. Patented May 13, 1919.

Application filed March 22, 1918. Serial No. 223,886.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Welding-Electrodes, of which the following is a specification.

The invention relates to welding electrodes constructed to receive the bodies to be welded, and consists in the construction, hereinafter set forth, whereby the recess or opening is provided with a removable metal lining, which may be taken out when burnt or otherwise injured, and a new one substituted. Preferably, said lining consists of a strip of metal seated at the edges of the opening or recess, since it is at said edges that burning of the electrode most commonly occurs.

In the accompanying drawing—

Figure 1:
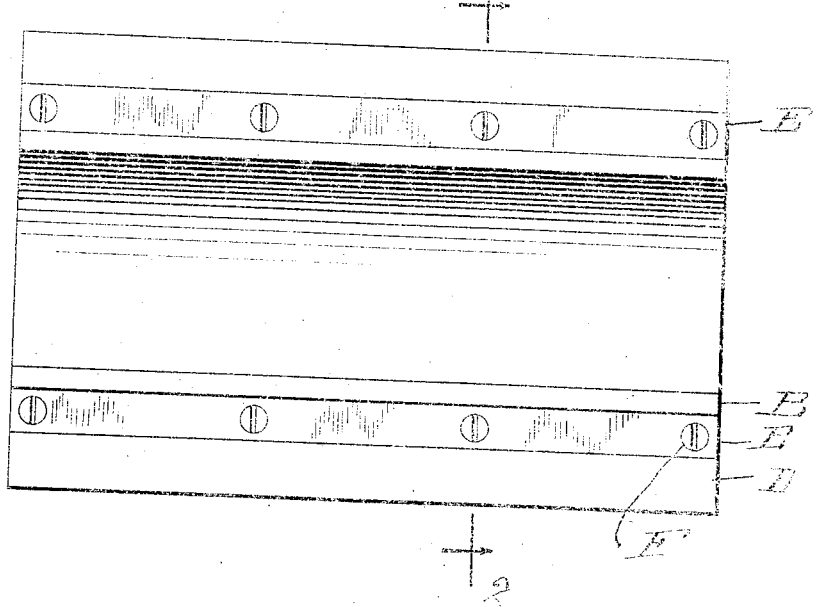
Figure 2:
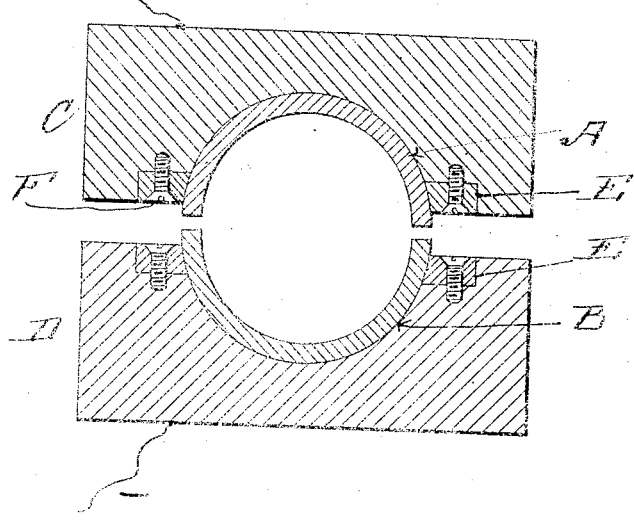

Figure 1 is a face view of an electrode containing our protective linings. Fig. 2 is a section on the line 2, 2 of Fig. 1.

Similar letters of reference indicate like parts.

As the two electrodes shown are exactly alike, a description of one applies to both. The bodies A, B to be welded are here longitudinal half sections of a cylinder, said sections being respectively seated in the electrodes C, D. Said electrodes are moved together in any suitable way so as to cause the edges of the sections A, B to meet, after which the welding current is established to unite said sections.

We have found that when such electrodes are integral masses of metal, the welding current is apt to burn, and so injure said electrodes at the angles between their flat opposing surfaces and the recesses receiving the bodies to be welded. We prevent this by removing the metal of the electrode at this angle so as to form a shoulder, upon which we seat a metal strip E, which is removably secured in place by screws F. Said strip forms a partial lining of the recess and conforms to the contour thereof. When any one of the strips E becomes burned or injured, it may be easily removed, and a new one substituted.

We claim:

1. In a welding electrode having a recess in which a body to be welded fits, a removable lining of metal in said recess.

2. In a welding electrode having a recess constructed to receive a body to be welded, removable linings of metal seated in the edges of said recess.

3. In a welding electrode having a recess constructed to receive a body to be welded, removable strips of metal seated in the face of said electrode and registering with the contour of said recess.

4. In a welding electrode having a concave recess, a lining extending over only a part of the concave surface of said recess near the edge.

In testimony whereof we have affixed our signatures in presence of two witnesses.

THOMAS E. MURRAY, JR.
JOSEPH B. MURRAY.

Witnesses:
GERTRUDE T. PORTER,
MAY T. McGARRY.